US012794385B2

(12) United States Patent
Arakawa

(10) Patent No.: US 12,794,385 B2
(45) Date of Patent: Nov. 10, 2026

(54) MOTOR CONTROL DEVICE AND MOTOR CONTROL METHOD

(71) Applicant: MINEBEA MITSUMI Inc., Kitasaku-gun (JP)

(72) Inventor: Yohei Arakawa, Kitasaku-gun (JP)

(73) Assignee: MINEBEA MITSUMI INC., Nagano (JP)

(*) Notice: Subject to any disclaimer, the term of this patent is extended or adjusted under 35 U.S.C. 154(b) by 250 days.

(21) Appl. No.: 18/709,677

(22) PCT Filed: Nov. 2, 2022

(86) PCT No.: PCT/JP2022/041026
§ 371 (c)(1),
(2) Date: May 13, 2024

(87) PCT Pub. No.: WO2023/090159
PCT Pub. Date: May 25, 2023

(65) Prior Publication Data

US 2025/0007432 A1 Jan. 2, 2025

(30) Foreign Application Priority Data

Nov. 19, 2021 (JP) ................................ 2021-188922

(51) Int. Cl.

| | |
|---|---|
| ***H02P 8/00*** | (2006.01) |
| ***H02P 8/12*** | (2006.01) |
| ***H02P 8/32*** | (2006.01) |

(52) U.S. Cl.
CPC .................. *H02P 8/32* (2013.01); *H02P 8/12* (2013.01); *H02P 2205/01* (2013.01)

(58) Field of Classification Search
CPC .. H02P 8/32; H02P 21/22; H02P 21/36; H02P 6/24; H02P 6/28; H02P 8/04; H02P 8/12
See application file for complete search history.

(56) References Cited

U.S. PATENT DOCUMENTS

2007/0040529 A1* 2/2007 Takebayashi ........... H02P 23/20 318/685
2018/0331640 A1 11/2018 Honda
2019/0260320 A1 8/2019 Takatsu

FOREIGN PATENT DOCUMENTS

AU 2006347701 B2 3/2008
EP 2 034 605 A1 11/2009
(Continued)

OTHER PUBLICATIONS

Extended European Search Report dated Sep. 25, 2025 for corresponding European Application No. 22895441.8.
(Continued)

*Primary Examiner* — Karen Masih
(74) *Attorney, Agent, or Firm* — Chrisman Gallo Tochtrop LLC

(57) ABSTRACT

To suppress a fluctuation in phase of a drive current when trying to switch between a feedback control and an open-loop control. A motor control device includes a current control unit controlling a current by either an open-loop control or a closed-loop control, and a rotational position correction unit correcting a second phase difference based on a first phase difference, the first phase difference being a difference between a rotational position of a rotor in a state where the current control unit controls the current by the closed-loop control and a target rotational position of the rotor, and the second phase difference being a difference between a rotational position in the closed-loop control and a rotational position in the open-loop control when the current control unit switches from the closed-loop control to the open-loop control.

6 Claims, 7 Drawing Sheets

(56) References Cited

FOREIGN PATENT DOCUMENTS

| | | | |
|---|---|---|---|
| JP | 2010-158115 | A | 7/2010 |
| JP | 2018-191461 | A | 11/2018 |
| JP | 2019-208329 | A | 12/2019 |
| JP | 2020-036515 | A | 3/2020 |
| WO | 2008/026270 | A1 | 3/2008 |

OTHER PUBLICATIONS

International Search Report for corresponding International Application No. PCT/JP2022/041026 mailed Jan. 17, 2023.
Written Opinion for corresponding International Application No. PCT/JP2022/041026 dated Jan. 17, 2023 and English translation.

* cited by examiner

MOTOR CONTROL DEVICE AND MOTOR CONTROL METHOD

CROSS-REFERENCE TO RELATED APPLICATIONS

This application is a national stage entry of International Application No. PCT/JP2022/041026 filed on Nov. 2, 2022, which claims the benefit of priority to Japanese Application No. JP2021-188922, filed Nov. 19, 2021, the entire disclosures of which are hereby incorporated herein by reference.

TECHNICAL FIELD

The present invention relates to a motor control device and a motor control method.

BACKGROUND ART

In a stepping motor, in order to implement a stable operation at the time of high-speed rotation, drive may be controlled by a closed-loop control. On the other hand, in the case where the drive of the stepping motor is controlled by the closed-loop control, a vibration motion called hunting may occur when stopping the rotation. Therefore, as a method of controlling the drive of the stepping motor, it is conceivable to switch from the closed-loop control to an open-loop control when stopping the rotation.

Note that, as a technique for controlling drive of a motor, there is known a technique for reducing a difference in rotational speed of a motor at the time of switching between an open-loop control and a feedback control (see Patent Document 1).

CITATION LIST

Patent Literature

Patent Document 1: JP 2018-191461 A

SUMMARY OF INVENTION

Technical Problem

However, in the stepping motor, when the drive control method is switched from the closed-loop control to the open-loop control, fluctuations in phase of drive current may occur. In the stepping motor, the fluctuations in phase of the drive current may cause vibrations. Therefore, when trying to switch between the feedback control and the open-loop control in the stepping motor, it is necessary to suppress the fluctuations in phase of the drive current.

The present invention is for the problem described above, as an example, and has an object to provide a motor control device capable of suppressing a fluctuation in phase of a drive current when trying to switch between a feedback control and an open-loop control.

Solution to Problem

In order to achieve the object described above, a motor control device according to the present invention includes: a current control unit configured to control a current by either an open-loop control of controlling a current to be supplied to a motor based on a current command value or a closed-loop control of controlling the current to be supplied to the motor based on the current command value and a rotational position of a rotor of the motor; and a rotational position correction unit configured to correct a second phase difference based on a first phase difference, the first phase difference being a difference between a rotational position of the rotor in a state where the current control unit controls the current by the closed-loop control and a target rotational position of the rotor, and the second phase difference being a difference between a rotational position in the closed-loop control and a rotational position in the open-loop control when the current control unit switches from the closed-loop control to the open-loop control.

According to the motor control device of the present invention, it is possible to suppress a fluctuation in phase of a drive current when trying to switch between the feedback control and the open-loop control.

DESCRIPTION OF EMBODIMENTS

A motor control device and a motor control method according to an embodiment of the present invention will be described below with reference to the drawings.

Figure 1:
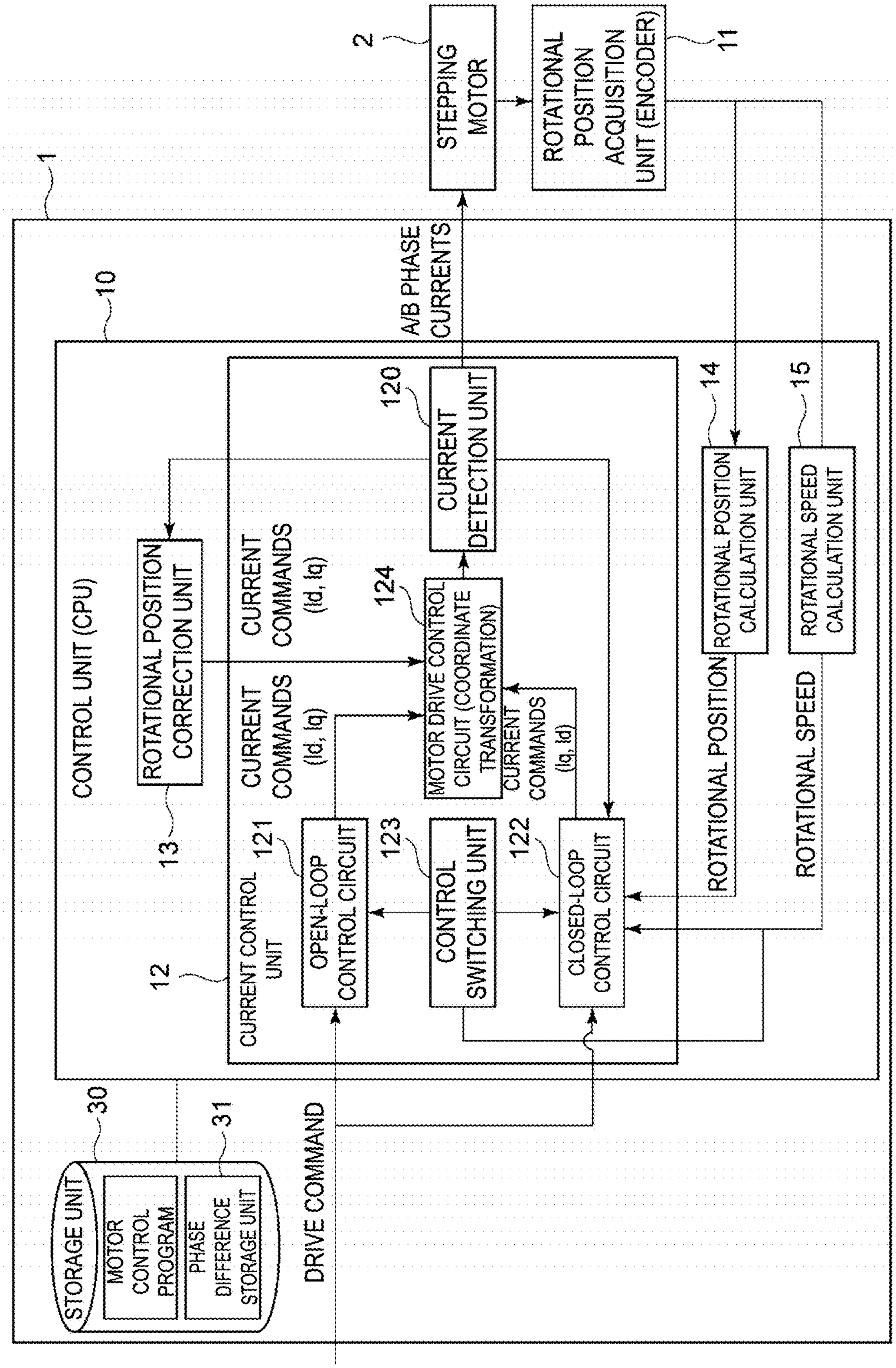
FIG. 1 is a functional block diagram schematically illustrating a configuration of a motor control device according to an embodiment of the present invention.

FIG. 1 is a functional block diagram schematically illustrating a configuration of a motor control device 1 according to an embodiment of the present invention.

As illustrated in FIG. 1, the motor control device 1 of the present embodiment includes a control unit 10 and a storage unit 30. The control unit 10 includes a current control unit 12 and a rotational position correction unit 13. Hereinafter, configurations and operations of the motor control device 1 will be specifically described.

The motor control device 1 is a device controlling an operation of a stepping motor 2 by controlling A-phase and B-phase currents supplied to the stepping motor 2.

Figure 2:
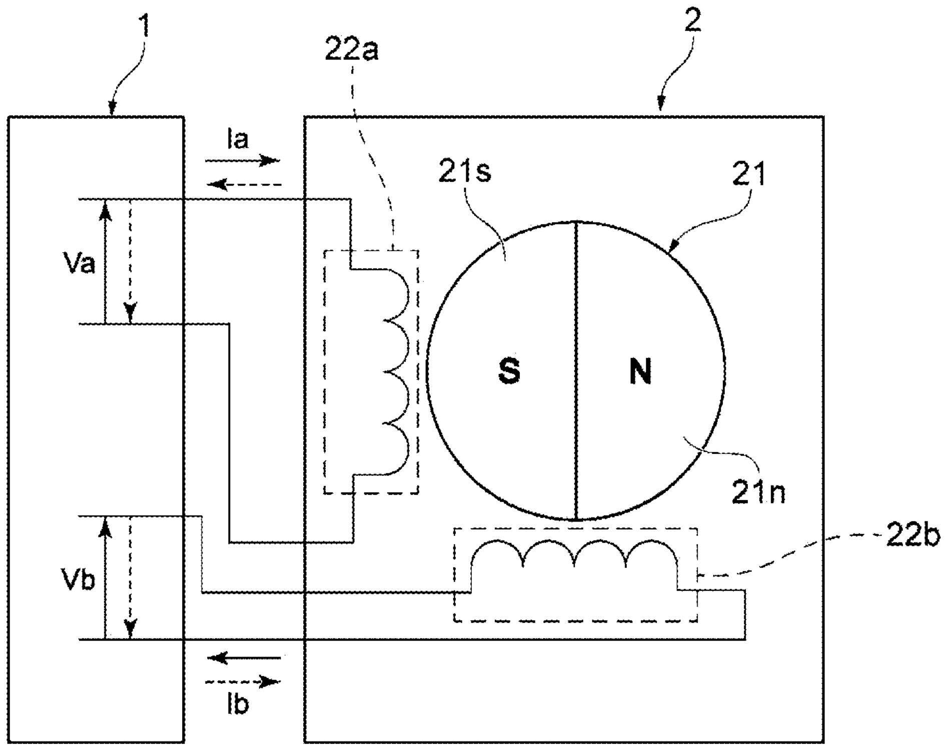
FIG. 2 is a diagram schematically illustrating a circuit configuration of a stepping motor.

FIG. 2 is a diagram schematically illustrating a circuit configuration of the stepping motor 2.

As illustrated in FIG. 2, the stepping motor 2 includes two coils 22*a* and 22*b*, a rotor 21, and a plurality of stator yokes (not illustrated).

Each of the coils 22*a* and 22*b* is a coil for exciting the stator yoke. Each of the coils 22*a* and 22*b* is connected to the control unit 10. The coil 22*a* is an A-phase coil. The coil 22*b* is a B-phase coil. Coil currents (A/B phase currents) with different phases flow through the respective coils 22*a* and 22*b*.

The rotor 21 includes a permanent magnet subjected to multipolar magnetization along a circumferential direction, and thus an S pole 21*s* and an N pole 21*n* are alternately inverted. Note that in FIG. 2, the rotor 21 is illustrated in a simplified manner, and thus one S pole 21*s* and one N pole 21*n* are provided. The stator yoke is disposed around the rotor 21 in proximity to an outer circumferential part of the rotor 21. The phases of the A/B phase currents flowing through each of the coils 22*a* and 22*b* are periodically switched, and thus the rotor 21 rotates.

As illustrated in FIG. 1, the rotational position acquisition unit 11 is connected to the stepping motor 2 and the motor control device 1. The rotational position acquisition unit 11 acquires a rotational position of the rotor 21 (see FIG. 2) of the stepping motor 2. Specifically, the rotational position acquisition unit 11 is, for example, an encoder.

The encoder is attached to an output shaft of the stepping motor 2. The encoder may be, for example, an incremental-type rotary encoder outputting two A-phase and B-phase pulse signals to a rotational position calculation unit 14 and a rotational speed calculation unit 15 of the motor control device 1 described below in response to rotation of the output shaft of the stepping motor 2. Note that the output phase of the encoder is not limited to two phases and may be, for example, one phase or three phases. In addition, the encoder is not limited to the incremental-type rotary encoder. The encoder may also be, for example, an absolute-type rotary encoder specifying rotation angles over a plurality of rotations of the output shaft of the stepping motor 2 and outputting the rotation angles to the rotational position calculation unit 14 and the rotational speed calculation unit 15.

As illustrated in FIG. 1, the current control unit 12, the rotational position correction unit 13, the rotational position calculation unit 14, and the rotational speed calculation unit 15 are implemented by a computer as an example of a program processing device including the control unit 10 as an example of a processor such as a CPU and the storage unit 30 to be implemented by various storage devices such as a RAM and a ROM. The computer is an example of a program processing device having a configuration. In the configuration, the control unit 10, the storage unit 30, and peripheral circuits such as a counter (timer), an A/D conversion circuit, a D/A conversion circuit, a clock generation circuit, and an input/output I/F circuit not illustrated are connected to one another via a bus or a dedicated line. By causing the control unit 10 to execute a computer program in order to execute a motor control method stored in the storage unit 30, the control unit 10 functions as the current control unit 12, the rotational position correction unit 13, the rotational position calculation unit 14, and the rotation calculation unit 15.

The rotational position calculation unit 14 calculates a rotational position of the rotor 21 of the stepping motor 2 based on the A-phase and B-phase pulse signals output by the encoder. The rotational position calculation unit 14 outputs the calculated rotational position to a closed-loop control circuit 122. The rotational speed calculation unit 15 calculates a rotational speed of the rotor 21 of the stepping motor 2 based on the A-phase and B-phase pulse signals output by the encoder. The rotational speed calculation unit 15 outputs the calculated rotational speed to the closed-loop control circuit 122 and a control switching unit 123.

The current control unit 12 controls a current by either an open-loop control of controlling a current to be supplied to the stepping motor 2 based on a current command value or a closed-loop control of controlling the current to be supplied to the stepping motor 2 based on the current command value and a rotational position. The current control unit 12 includes a current detection unit 120, an open-loop control circuit 121, a closed-loop control circuit 122, a control switching unit 123, and a motor drive control circuit 124, as functional units controlling the current to be supplied to the stepping motor 2.

The current detection unit 120 detects the A/B phase currents output from the motor drive control circuit 124 and outputs the A/B phase currents to the closed-loop control circuit 122 and the rotational position correction unit 13. Specifically, the current detection unit 120 receives a sensing result of a coil current output from a current sensor (not illustrated). The coil current is a current flowing through the coil of each phase of the stepping motor 2. The current sensor senses the coil current. The current sensor outputs a sensing result of the coil current to the current detection unit 120. The current sensor is, for example, a shunt resistor.

The current detection unit 120 measures the A/B phase currents based on the input sensing result. The current detection unit 120 outputs measured values of the A/B phase currents to the closed-loop control circuit 122 and the rotational position correction unit 13. The current detection unit 120 includes, for example, an A/D conversion circuit.

The open-loop control circuit 121 generates a current command value of the stepping motor 2 in response to a drive command of the stepping motor 2 input from the outside such as a host device using the stepping motor 2. The drive command indicates, for example, a command position in the operation of the stepping motor 2. The current command value generated by the open-loop control circuit 121 is output to the motor drive control circuit 124. Note that, although the drive command is described as being input from the outside in the present embodiment, the drive command may be generated inside the control unit 10.

The closed-loop control circuit 122 generates a current command value by a feedback control. Specifically, the closed-loop control circuit 122 generates the current command value based on the drive command, the rotational position of the rotor 21 calculated by the rotational position calculation unit 14, the rotational speed calculated by the rotational speed calculation unit 15, and the A/B phase currents supplied to the stepping motor 2 acquired from the current detection unit 120. The closed-loop control circuit 122 obtains a difference between the command position indicated by the drive command and the rotational position of the rotor 21. The closed-loop control circuit 122 determines a target speed of the rotor 21 based on the obtained difference in position. The closed-loop control circuit 122 obtains a difference between the target speed and the rotational speed of the rotor 21. The closed-loop control circuit 122 determines a target current value based on the obtained difference in speed. The closed-loop control circuit 122 obtains a difference between the target current value and the A/B phase current. The closed-loop control circuit 122 generates a current command value based on the obtained difference in current. The current command value generated by the closed-loop control circuit 122 is output to the motor drive control circuit 124.

The control switching unit 123 switches the control of current of the stepping motor 2 to either the open-loop control circuit 121 or the closed-loop control circuit 122 in accordance with the rotational speed of the rotor 21 calculated by the rotational speed calculation unit 15. The control switching unit 123 switches between the open-loop control circuit 121 and the closed-loop control circuit 122 based on whether the rotational speed of the rotor 21 has reached a predetermined condition, for example, a threshold value. By the control switching unit 123 operating in this way, the motor control device 1 can suppress occurrence of hunting when the rotor 21 of the stepping motor 2 is in a stopped state.

The motor drive control circuit 124 converts the current command value generated by the open-loop control circuit 121 or the closed-loop control circuit 122 into a current signal of a two-phase (A-phase and B-phase) fixed coordinate system and outputs the current signal to the stepping motor 2.

Figure 3:
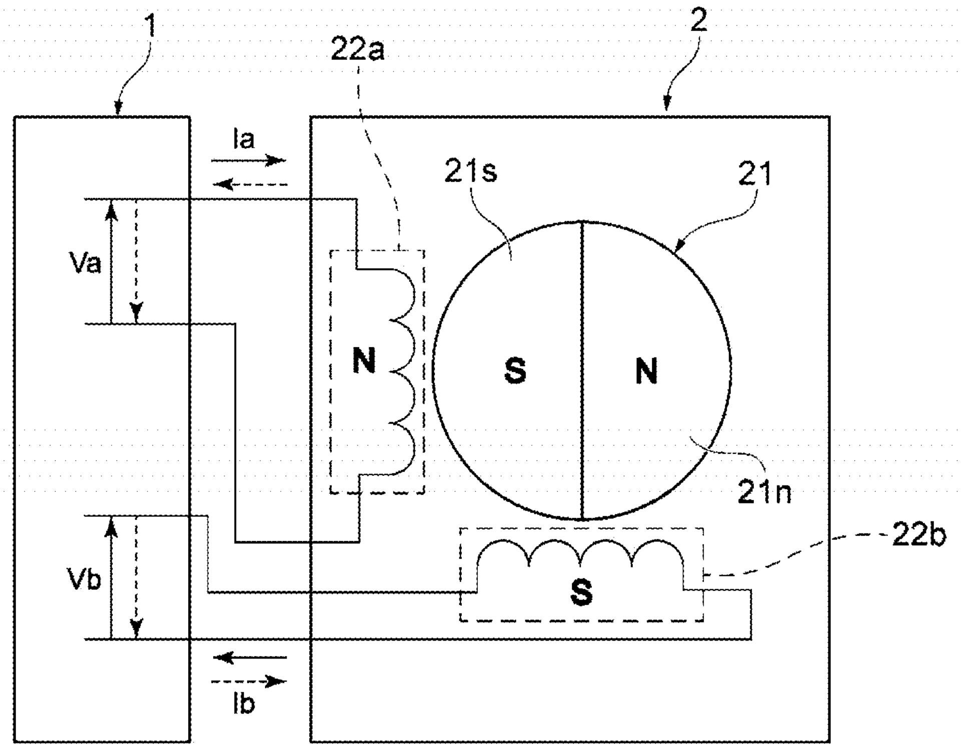
FIG. 3 is a schematic view illustrating a relationship between magnetic poles of a normal rotor and magnetic poles of coils in the stepping motor illustrated in FIG. 2.
Figure 4:
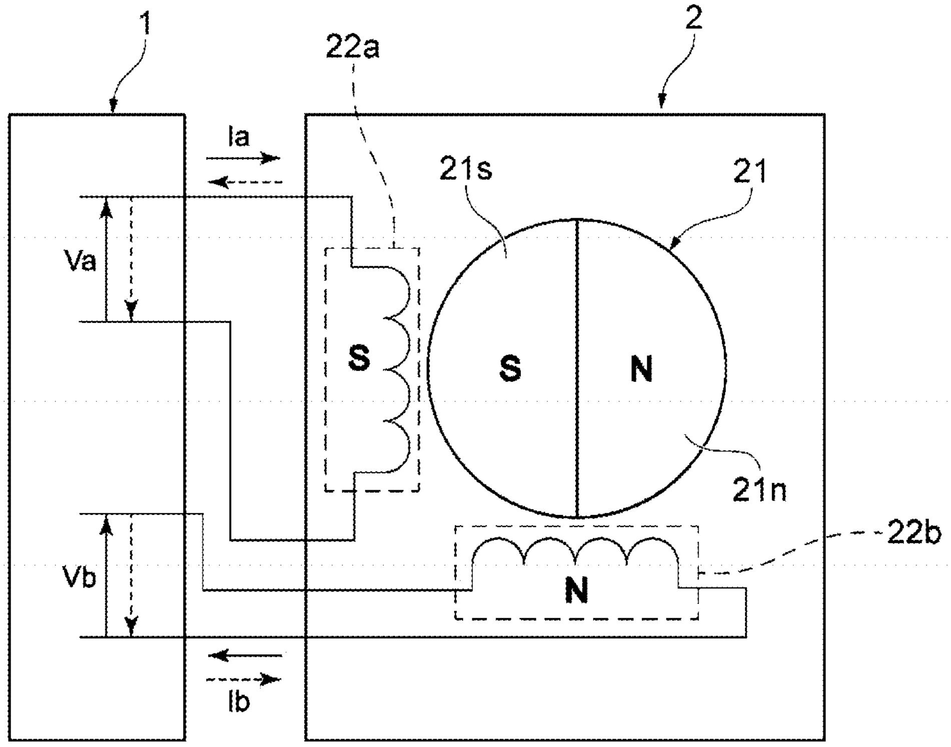
FIG. 4 is a schematic diagram illustrating a relationship between the magnetic poles of the rotor and the magnetic poles of the coils when a fluctuation in phase of a drive current occurs in the stepping motor illustrated in FIG. 2.

FIG. 3 is a schematic diagram illustrating a relationship between magnetic poles of the normal rotor 21 and magnetic poles of the coils 22 and 23 in the stepping motor 2. FIG. 4 is a schematic diagram illustrating a relationship between the magnetic poles of the rotor 21 and the magnetic poles of the coils 22*a* and 22*b* when a fluctuation in phase of a drive current occurs in the stepping motor 2. FIG. 4 shows an example of the coil 22*a* having the S pole and being adjacent to the S pole 21*s* of the rotor 21. With reference to FIGS. 3 and 4, a description will be given of a difference between the rotational position in the closed-loop control and the rotational position in the open-loop control of performing correction by the rotational position correction unit 13.

As illustrated in FIG. 3, in the stepping motor 2, the current control unit 12 of the motor control device 1 normally controls the current, and thus the phase of the current energizing each of the A-phase coil 22*a* and the B-phase coil 22*b* is gradually switched. By controlling the current energizing each of the A-phase coil 22*a* and the B-phase coil 22*b* as described above, the rotor 21 of the stepping motor 2 rotates smoothly. The control of the current to each of the A-phase coil 22*a* and the B-phase coil 22*b* as described above is performed in either the open-loop control or the closed-loop control.

Figure 5:
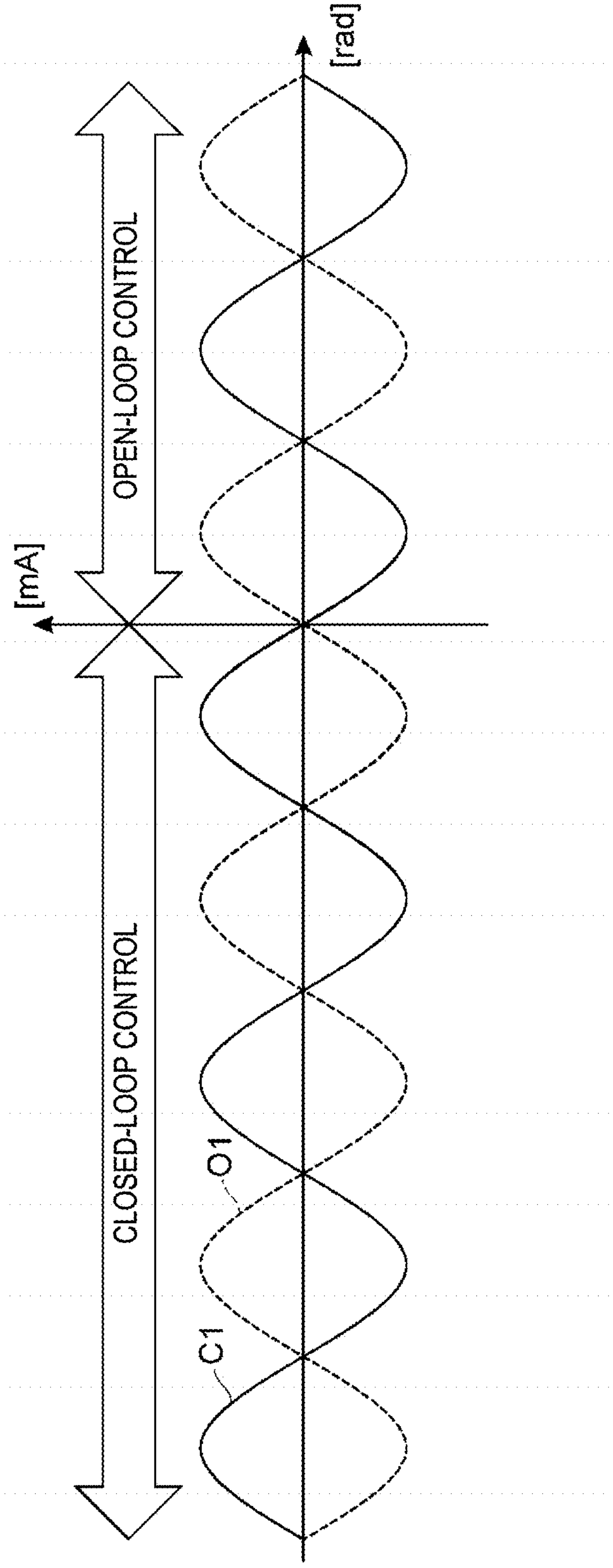
FIG. 5 is a schematic diagram illustrating a relationship between a command value of a rotational position of a rotor and an actual rotational position when a closed-loop control is switched to an open-loop control by a motor control device of a reference example.

FIG. 5 is a schematic diagram illustrating a relationship between a command value of a rotational position of a rotor and an actual rotational position when the closed-loop control is switched to the open-loop control by a motor control device of a reference example. In FIG. 5, a waveform C1 indicated by a solid line indicates a phase of a drive current subjected to the closed-loop control by the motor control device of the reference example. In addition, in FIG. 5, a waveform O1 indicated by a broken line indicates a phase of the drive current subjected to the open-loop control by the motor control device of the reference example. In the motor control device of the reference example, the phase of the drive current subjected to the open-loop control is not subjected to the feedback control in accordance with the rotational position of the rotor 21. For this reason, in FIG. 5, the phase of the drive current subjected to the open-loop control indicated by the waveform O1 is shifted from the phase of the drive current subjected to the closed-loop control indicated by the waveform C1 by, for example, $\pi$ (180°).

As described above, when there is a difference between the phase of the drive current subjected to the open-loop control and the phase of the drive current subjected to the closed-loop control, in the stepping motor 2, the magnetic poles of the coils 22*a* and 22*b* controlled by the closed-loop control rapidly change to the magnetic poles of the coils 22*a* and 22*b* controlled by the open-loop control. When the magnetic poles of the coils 22*a* and 22*b* rapidly change and, for example, as illustrated in FIG. 4, the magnetic poles of the rotor 21 and the magnetic poles of the coils 22*a* and 22*b* have the same polarity, the magnetic poles (the S pole 21*s* and the N pole 21*n*) of the rotor 21 rapidly repel the magnetic poles of the coils 22*a* and 22*b*. In such a case, in the stepping motor 2, vibration is considered to be generated from the rotor 21. In addition, in the above-described case, in the stepping motor 2, the magnetic poles (the S pole 21*s* and the N pole 21*n*) of the rotor 21 are considered not to follow the change in the magnetic poles of the coils 22*a* and 22*b*, and thus a step-out occurs.

In order to suppress the above-described fluctuation in phase of the drive current in the stepping motor 2, the rotational position correction unit 13 specifies a difference (first phase difference) between an actual rotational position of the rotor 21 in the open-loop control and a target rotational position of the rotor 21. Based on the acquired first phase difference, the rotational position correction unit 13 corrects a difference (second phase difference) between a rotational position in the closed-loop control and a rotational position in the open-loop control when the current control unit 12 switches from the closed-loop control to the open-loop control. The first phase difference specified by the rotational position correction unit 13 is stored in a phase difference storage unit 31 provided at the storage unit 30.

Figure 6:
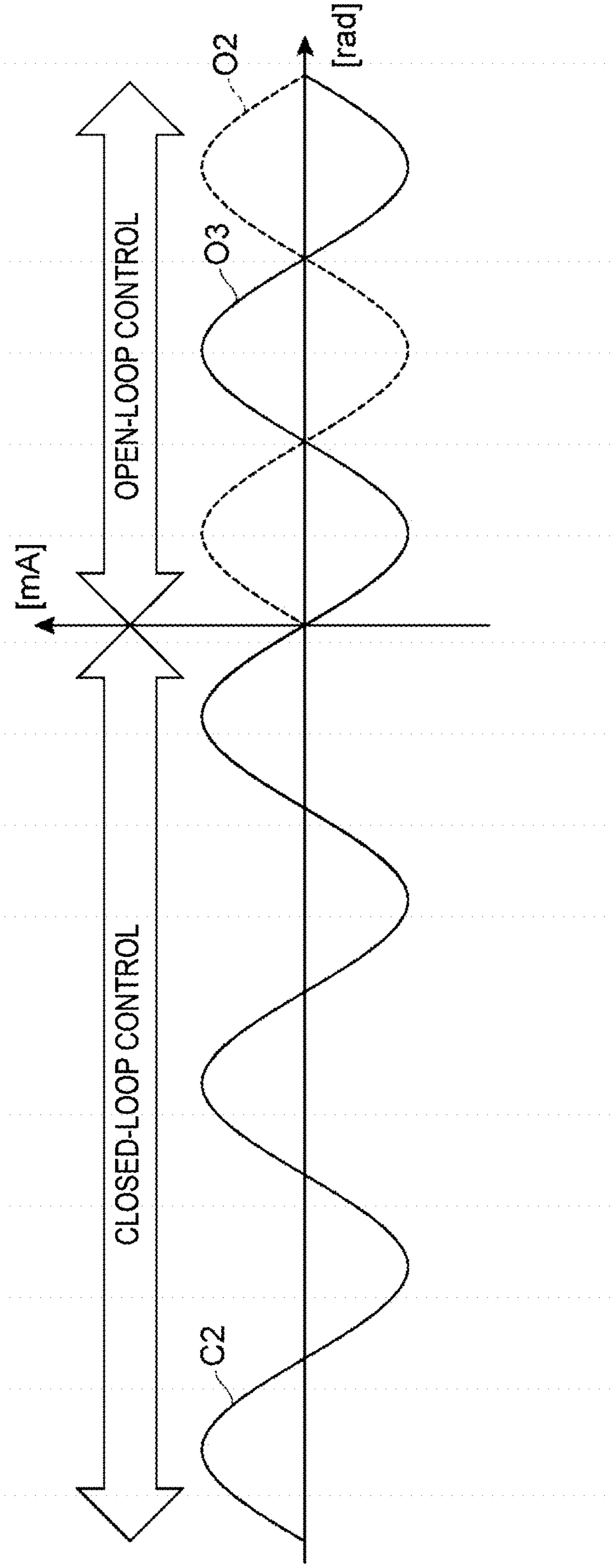
FIG. 6 is a schematic diagram illustrating a relationship between a command value of a rotational position of a rotor and an actual rotational position when a closed-loop control is switched to an open-loop control by the motor control device illustrated in FIG. 1.

FIG. 6 is a schematic diagram illustrating a relationship between a command value of a rotational position of the rotor 21 and an actual rotational position when the closed-loop control is switched to the open-loop control by the motor control device 1. In FIG. 6, a waveform C2 indicated by a solid line indicates a phase of a drive current controlled by the closed-loop control in the motor control device 1. In addition, in FIG. 6, a waveform O2 indicated by a broken line indicates a phase of the drive current in the open-loop control before corrected by the rotational position correction unit 13 in the motor control device 1. Similarly to the waveform O1 illustrated in FIG. 5, the phase of the waveform O2 is shifted from the phase of the drive current in the closed-loop control indicated by the waveform C2 by, for example, $\pi$(180°).

When the current control unit 12 switches from the closed-loop control to the closed-loop control, the rotational position correction unit 13 specifies, as the second phase difference, a difference between the phase of the current in the closed-loop control indicated by the waveform C2 in FIG. 6 and the phase of the current in the open-loop control indicated by the waveform O2 in FIG. 6.

The rotational position correction unit 13 corrects the specified second phase difference based on the previously acquired first phase difference. In FIG. 6, a phase difference between the phase of the drive current by the open-loop control after the correction indicated by a waveform O3 and the phase of the drive current in the closed-loop control indicated by the waveform C2 is eliminated.

The first phase difference and the second phase difference can be specified from, for example, the phase (electrical angle) of the drive current of the stepping motor 2. Specifically, the first phase difference can be specified by, for example, a phase difference between a phase of the drive current by the current command value generated by the open-loop control circuit 121 based on the drive command from the outside such as a host device and a phase of the drive current by the current command value generated by the closed-loop control circuit 122. Note that the first phase difference may be specified by converting the rotational position of the rotor 21 into the phase of the drive current of the stepping motor 2. In addition, the first phase difference and the second phase difference may be specified based on the rotational position (mechanical angle) of the rotor 21 acquired from an encoder attached to the stepping motor 2, for example.

Figure 7:
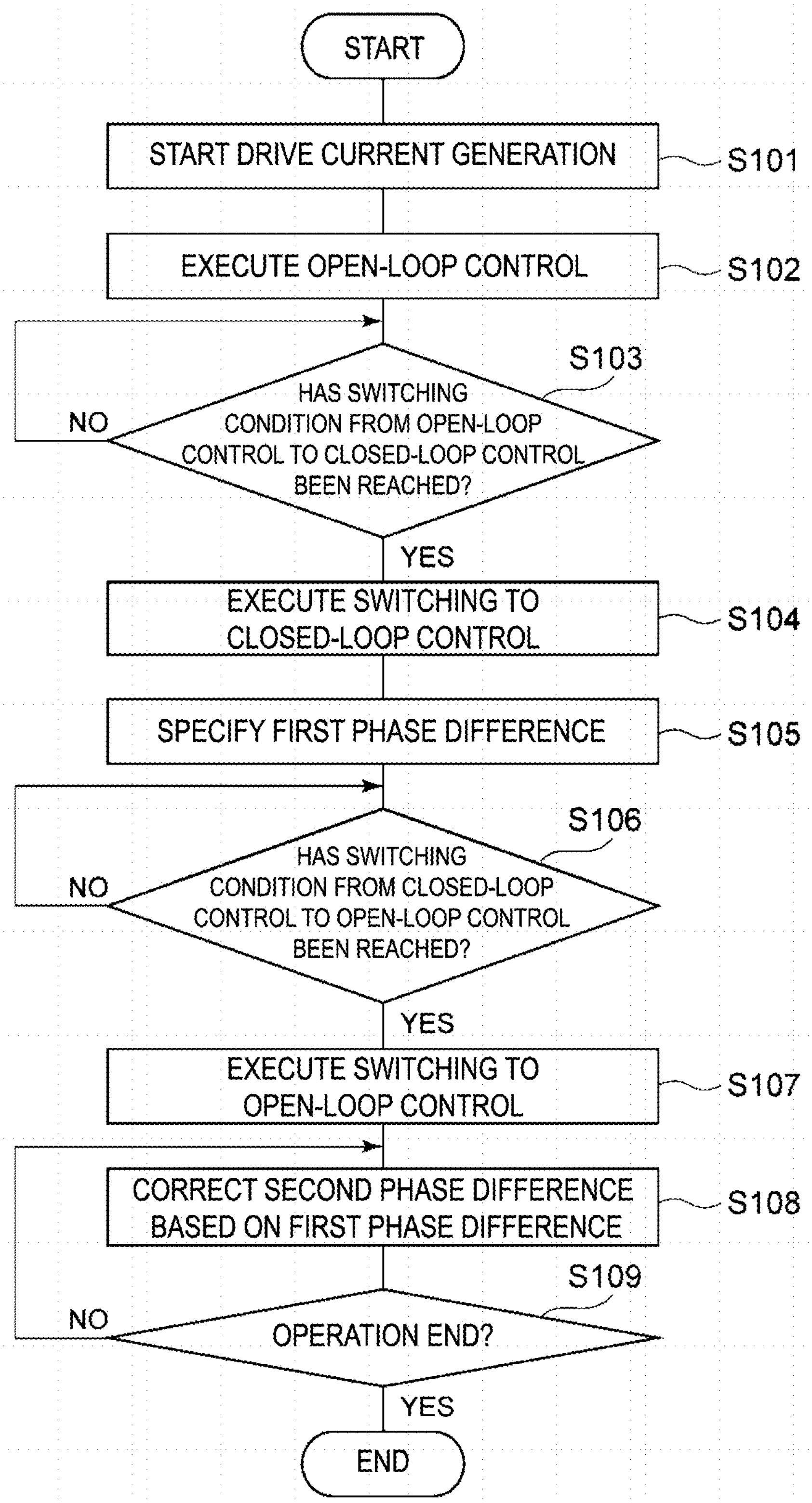
FIG. 7 is a flowchart illustrating an example of a motor control method executed by the motor control device illustrated in FIG. 1.

FIG. 7 is a flowchart illustrating an example of a motor control method executed by the motor control device. An example of the motor control method by the motor control device 1 described above will be described with reference to FIG. 7.

In response to a drive command from the outside such as a host device, the motor control device 1 starts generation of a drive current of the stepping motor 2 (step S101). The motor control device 1 causes the open-loop control circuit 121 to execute control of the drive current of the stepping motor 2 in response to the drive command from the outside such as a host device (step S102).

In the motor control device 1, the control switching unit 123 determines whether a switching condition from the open-loop control to the closed-loop control has been reached (step S103). The switching condition from the open-loop control to the closed-loop control is, for example, whether the rotational speed of the rotor 21 acquired from the rotational position acquisition unit 11 has reached a speed exceeding a predetermined condition. When the control switching unit 123 determines that the rotational speed of the rotor 21 has not reached the predetermined condition (S103: NO), the control switching unit 123 repeats the processing of S103.

When the rotational speed of the rotor 21 has reached the predetermined condition (S102: YES), the control switching unit 123 switches the circuit for controlling the drive current of the stepping motor 2 from the open-loop control circuit 121 to the closed-loop control circuit 122, and executes control processing of the drive current (step S104).

The rotational position correction unit 13 specifies a difference (first phase difference) between the rotational position of the rotor 21 in the open-loop control and the rotational position of the rotor 21 in the closed-loop control when the open-loop control is switched to the closed-loop control (step S105).

In the motor control device 1, the control switching unit 123 determines whether a switching condition from the closed-loop control to the open-loop control has been reached (step S106). The switching condition from the closed-loop control to the open-loop control is, for example, whether the rotational speed of the rotor 21 acquired from the rotational position acquisition unit 11 has reached a speed below a predetermined condition. When the control switching unit 123 determines that the rotational speed of the rotor 21 has not reached the predetermined condition (S106: NO), the control switching unit 123 repeats the processing of S106.

When the rotational speed of the rotor 21 has reached a speed below the predetermined condition (S106: YES), the control switching unit 123 switches the circuit for controlling the drive current of the stepping motor 2 from the closed-loop control circuit 122 to the open-loop control circuit 121, and executes control processing of the drive current (step S107).

The rotational position correction unit 13 corrects, based on the first phase difference, a difference (second phase difference) between the rotational position of the rotor 21 in the closed-loop control and the rotational position of the rotor 21 in the open-loop control when the closed-loop control is switched to the open-loop control (step S108).

The motor control device 1 determines whether there is an operation end command such as an end of the drive command from the outside such as a host device (step S109), and ends the processing when there is an operation end command (S109: YES). On the other hand, when there is no operation end command (S109: NO), the motor control device 1 repeats the processing of correcting the second phase difference based on the first phase difference indicated in S108.

The motor control device 1 configured as described above includes the current control unit 12 controlling the current by either the open-loop control or the closed-loop control. The motor control device 1 also includes the rotational position correction unit 13 correcting a difference between a rotational position in the closed-loop control and a rotational position in the open-loop control when the current control unit switches from the closed-loop control to the open-loop control. By including the rotational position correction unit 13, the motor control device 1 can suppress a change between the magnetic poles of the coils 22*a* and 22*b* controlled by the closed-loop control and the magnetic poles of the coils 22*a* and 22*b* controlled by the open-loop control, even when there is a difference between the phase of the drive current controlled by the open-loop control and the phase of the drive current controlled by the closed-loop control. For this reason, the motor control device 1 can suppress occurrence of vibration from the rotor 21 of the stepping motor 2. In addition, the motor control device 1 can suppress occurrence of a step-out because the magnetic poles of the rotor 21 of the stepping motor 2 cannot follow the change in the magnetic poles of the coils 22*a* and 22*b*.

Therefore, according to the motor control device 1 including the rotational position correction unit 13, it is possible to suppress the fluctuation in phase of the drive current when trying to switch between the feedback control and the open-loop control.

In addition, a person skilled in the art can appropriately modify the present invention according to conventionally known knowledge. Such modifications are of course included in the scope of the present invention as long as these modifications still include the configuration of the disclosure.

REFERENCE SIGNS LIST

1: Motor control device, 2: Stepping motor, 10: Control unit, 11: Rotational position acquisition unit, 12: Current control unit, 13: Rotational Position correction unit, 14: Rotational position calculation unit, 15: Rotational speed calculation unit, 21: Rotor, 21*s*: S pole, 21*n*: N pole, 22*a*, 22*b*: Coil, 30: Storage unit, 31: Phase difference storage unit, 121: Open-loop control circuit, 122: Closed-loop control circuit, 123: Control switching unit, 124: Motor drive control circuit

The invention claimed is:

1. A motor control device comprising:

a rotational position calculation unit configured to calculate a rotational position of a rotor of the motor based on signals output by a rotational position acquisition unit comprising an encoder;

a current control unit configured to control a current by either an open-loop control of controlling a current to be supplied to a motor based on a current command value or a closed-loop control of controlling the current to be supplied to the motor based on the current command value and the rotational position of the rotor of the motor; and a rotational position correction unit configured to correct a second phase difference based on a first phase difference, the first phase difference being a difference between a rotational position of the rotor in a state where the current control unit controls the current by the closed-loop control and a target rotational position of the rotor, the second phase difference being a difference between a rotational position in the closed-loop control and a rotational position in the open-loop control when the current control unit switches from the closed-loop control to the open-loop control, wherein the first phase difference and the second phase difference are specified based on the rotational position of the rotor acquired from the encoder that outputs pulse signals or rotational angles to the rotational position calculation unit.

2. The motor control device according to claim 1, comprising:

a phase difference storage unit configured to store the first phase difference.

3. The motor control device according to claim 1, wherein the rotational position correction unit specifies the first phase difference based on a difference between a phase of the current in the state where the current control unit controls the current by the closed-loop control and a phase of the current in a state where the current control unit controls the current by the open-loop control.

4. The motor control device according to claim 1, wherein the rotational position correction unit specifies, as the second phase difference, a difference between a phase of the current in the closed-loop control and a phase of the current in the open-loop control when the current control unit switches from the closed-loop control to the open-loop control.

5. The motor control device according to claim 1, wherein the rotational position correction unit specifies the first phase difference based on a difference between a phase of the current in the state where the current control unit controls the current by the closed-loop control and a phase of the current by the current command value.

6. A motor control method for causing a computer to execute:

acquiring a rotational position of a rotor of a motor based on signals output by a rotational position acquisition unit comprising an encoder;

controlling a current by either an open-loop control of controlling a current to be supplied to the motor based on a current command value or a closed-loop control of controlling the current to be supplied to the motor based on the current command value and a rotational position; and correcting a second phase difference based on a first phase difference, the first phase difference being a difference between a rotational position of the rotor in a state where the current is controlled by the closed-loop control and a target rotational position of the rotor in a state where the current is controlled by the open-control loop, the second phase difference being a difference between a rotational position in the closed-loop control and a rotational position in the open-loop control when switching from the closed-loop control to the open-loop control, wherein the first phase difference and the second phase difference are specified based on the rotational position of the rotor acquired from the encoder that outputs pulse signals or rotational angles to the rotational position calculation unit.

* * * * *